US012179263B2

(12) United States Patent
Kasperchik et al.

(10) Patent No.: US 12,179,263 B2
(45) Date of Patent: Dec. 31, 2024

(54) THREE-DIMENSIONAL PRINTING WITH WETTING AGENT

(71) Applicant: Hewlett-Packard Development Company, L.P., Spring, TX (US)

(72) Inventors: Vladek Kasperchik, Corvallis, OR (US); Jennifer Wu, Corvallis, OR (US); Michael G. Monroe, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 500 days.

(21) Appl. No.: 17/626,988

(22) PCT Filed: Sep. 5, 2019

(86) PCT No.: PCT/US2019/049722
§ 371 (c)(1),
(2) Date: Jan. 13, 2022

(87) PCT Pub. No.: WO2021/045763
PCT Pub. Date: Mar. 11, 2021

(65) Prior Publication Data
US 2022/0267620 A1   Aug. 25, 2022

(51) Int. Cl.
*C09D 11/033* (2014.01)
*B22F 1/10* (2022.01)
(Continued)

(52) U.S. Cl.
CPC ............... *B22F 10/14* (2021.01); *B22F 1/10* (2022.01); *B28B 1/001* (2013.01); *B33Y 10/00* (2014.12);
(Continued)

(58) Field of Classification Search
None
See application file for complete search history.

(56) References Cited

U.S. PATENT DOCUMENTS

| | | |
|---|---|---|
| 6,398,357 B1 | 6/2002 | Holloway et al. |
| 6,596,224 B1 | 7/2003 | Sachs et al. |
| 7,389,154 B2 | 6/2008 | Hunter et al. |
| 10,030,154 B2 | 7/2018 | Naruse et al. |
| 2016/0272817 A1 | 9/2016 | Naruse et al. |

(Continued)

FOREIGN PATENT DOCUMENTS

| | | |
|---|---|---|
| CN | 106825387 A | 6/2017 |
| CN | 107708972 A | 2/2018 |

(Continued)

OTHER PUBLICATIONS

S. Michaels, "Production of Metal Parts Using the Three Dimensional Printing Process", Dept. of Mechanical Engineering, MIT, Nov. 29, 1993.

Feng Ruiqian et al., "Printing Principles and Technology", Printing Industry Press, 1st edition, Apr. 1999, 20 pages.

*Primary Examiner* — Anthony M Liang
(74) *Attorney, Agent, or Firm* — HP Inc. Patent Department

(57) ABSTRACT

A multi-fluid kit for three-dimensional printing can include a wetting agent and a binding agent. The wetting agent can include from 0 wt % to about 49.8 wt % water, from about 0.5 wt % to about 30 wt % film-forming organic solvent that can have a boiling point from greater than about 100° C. to about 350° C., and from about 30 wt % to about 99.5 wt % amphiphilic solvent that can have a boiling point from about 45° C. to less than about 100° C. The amphiphilic solvent can be water-miscible and can be present in the wetting agent at a greater concentration than the water and at a greater concentration than the film-forming solvent. The binding agent can include from about 2 wt % to about 30 wt % of a polymer binder dispersed in an aqueous liquid vehicle.

15 Claims, 2 Drawing Sheets

(51) Int. Cl.
  *B22F 10/14* (2021.01)
  *B28B 1/00* (2006.01)
  *B33Y 10/00* (2015.01)
  *B33Y 40/20* (2020.01)
  *B33Y 70/00* (2020.01)
  *B33Y 70/10* (2020.01)
  *C09D 11/037* (2014.01)
  *C09D 11/107* (2014.01)
  *C09D 11/322* (2014.01)
  *B22F 12/55* (2021.01)

(52) U.S. Cl.
  CPC ............... *B33Y 40/20* (2020.01); *B33Y 70/00* (2014.12); *B33Y 70/10* (2020.01); *C09D 11/033* (2013.01); *C09D 11/037* (2013.01); *C09D 11/107* (2013.01); *C09D 11/322* (2013.01); *B22F 12/55* (2021.01)

(56) References Cited

U.S. PATENT DOCUMENTS

| | | |
|---|---|---|
| 2017/0246807 A1 | 8/2017 | Emamjomeh et al. |
| 2018/0141271 A1 | 5/2018 | Günther et al. |
| 2019/0009465 A1 | 1/2019 | Monroe et al. |
| 2019/0091766 A1 | 3/2019 | Kasperchik et al. |
| 2023/0173756 A1 | 6/2023 | Kasperchik et al. |

FOREIGN PATENT DOCUMENTS

| | | |
|---|---|---|
| CN | 110177638 A | 8/2019 |
| CN | 110177677 A | 8/2019 |
| EP | 0644809 B1 | 7/2001 |
| EP | 1272334 B1 | 11/2012 |
| JP | 2016-199685 A | 12/2016 |
| WO | WO-2018156933 A1 | 8/2018 |
| WO | WO-2018156938 A1 | 8/2018 |
| WO | WO-2019009906 A1 | 1/2019 |

THREE-DIMENSIONAL PRINTING WITH WETTING AGENT

BACKGROUND

Three-dimensional (3D) printing may be an additive printing process used to make 3D solid parts from a digital model. 3D printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

Figure 1:
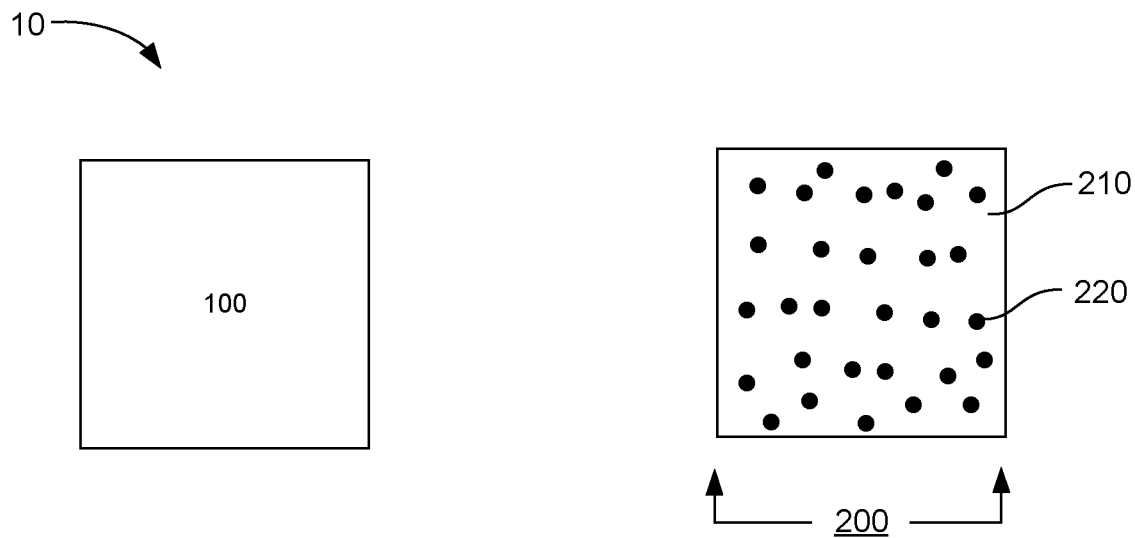
FIG. 1 graphically illustrates an example multi-fluid kit in accordance with the present disclosure.

Three-dimensional (3D) printing can be an additive process that can involve the application of successive layers of particulate build material with chemical binders or adhesives printed thereon to bind the successive layers of the particulate build materials together. In some processes, application of a binding agent with a binder therein can be utilized to form a green body object and then a fused 3D physical object can be formed therefrom. More specifically, a binding agent can be selectively applied to a layer of a particulate build material on a support bed to pattern a selected region of the layer of the particulate build material and then another layer of the particulate build material can be applied thereon. The binding agent can be applied to another layer of the particulate build material and these processes can be repeated to form a green part (also known as a 3D green body or object) which can then be heat fused to form a fused 3D object.

In 3D printing, a binding agent can impact a layer of the particulate build material with a velocity and force that can disrupt the layer of the particulate build material. Droplets of the binding agent can create structural defects, such as craters, by ejecting loose particles and/or irregular agglomeration of particles. In addition, binding agents can exhibit delayed infiltration of the particulate build material. These printing interactions can result in surface roughness on a printed object and can create cavities in a green body object that can be formed. Cavities in a green body object can inversely relate to density in a fused 3D object. Green body objects with more cavities (either in quantity or volume) can be less dense than green body objects with fewer cavities. An increase in a cavity space of a green body object can decrease a density of the fused 3D object, leaving the 3D object subjectable to fatigue and/or cracking.

In accordance with this, in one example, a multi-fluid kit can include a wetting agent and a binding agent. The wetting agent can include from 0 wt % to about 49.8 wt % water, from about 0.2 wt % to about 30 wt % film-forming organic solvent that can have a boiling point from greater than about 100° C. to about 350° C., and from about 30 wt % to about 99.5 wt % amphiphilic solvent that can have a boiling point from about 45° C. to less than about 100° C. The amphiphilic solvent can be water-miscible and can be present in the wetting agent at a greater concentration than the water and at a greater concentration than the film-forming solvent. The binding agent can include from about 2 wt % to about 30 wt % of a polymer binder dispersed in an aqueous liquid vehicle. In an example, the film-forming solvent can include an aliphatic alcohol, aromatic alcohol, alkyl diol, glycol, glycol ether, polyglycol ether, 2-pyrrolidinone, caprolactam, formamide, acetamide, 1,2-butanediol, C3 to C12 alcohol, or a mixture thereof. In yet another example, the amphiphilic solvent can include ethanol, methanol, 1-propanol, isopropanol, 1-butanol, acetone, methyl ethyl keytone, dimethylformamide, tetrahydrofuran, 1,4-dioxane, acetonitrile, or a mixture thereof. In yet another example, a surface tension of the amphiphilic solvent can range from about 20 N/m to about 40 N/m when measured at 20° C. In a further example, the amphiphilic solvent can be ethanol and the film-forming solvent can be 2-pyrrolidinone. In one example, the binding agent can further include a co-solvent and the co-solvent in the binding agent can be the same as the film-forming solvent in the wetting agent. In another example, the wetting agent can be a non-aqueous wetting agent.

In another example, a three-dimensional printing kit can include a wetting agent, a binding agent, and a particulate build material. The wetting agent can include from 0 wt % to about 49.8 wt % water, from about 0.2 wt % to about 60 wt % of a film-forming solvent that can have a boiling point from greater than about 100° C. to about 350° C., and from about 30 wt % to about 99.5 wt % of an amphiphilic water-miscible solvent that can have a boiling point from about 45° C. to less than about 100° C. The binding agent can include from about 2 wt % to about 30 wt % of a polymer binder dispersed in an aqueous liquid vehicle. The particulate build material can include from about 80 wt % to 100 wt % metal particles, ceramic particles, or both metal particles and ceramic particles. In one example, the film-forming solvent can be present in the wetting agent at from about 1 wt % to about 15 wt %. In another example, the film-forming solvent can include 1,2-butanediol or other diols or glycols and the amphiphilic solvent can include ethanol. In yet another example, the particulate build material can include from about 90 wt % to 100 wt % of the metal particles, and the metal particles can have a D50 particle size distribution value of from about 3 μm to about 100 μm. In a further example, the amphiphilic solvent can be present in the wetting agent at a greater concentration than the water and at a greater concentration than the film-forming solvent.

In another example, a method of three-dimensional printing can include iteratively applying individual build material layers of a particulate build material onto a powder bed. The particulate build material can include from about 80 wt % to 100 wt % metal particles, ceramic particles, or both metal particles and ceramic particles. The method can further include, based on a 3D object model, iteratively and selectively applying a wetting agent to individual build material layers. The wetting agent can include from 0 wt % to about 49.8 water, from about 0.2 wt % to about 60 wt % of a film-forming solvent that can have a boiling point from greater than about 100° C. to about 350° C., and from about 30 wt % to about 99.5 wt % of an amphiphilic water-miscible solvent that can have a boiling point from about 45°

C. to less than about 100° C. The method can further include based on a 3D object model, iteratively and selectively applying a binding agent to individual build material layers to define individually patterned object layers that can become adhered to one another to form a layered green body object. The binding agent can include from about 2 wt % to about 30 wt % of a polymer binder dispersed in an aqueous liquid vehicle. In an example, the method further includes sintering the layered green body object to form a heat fused article. In a further example, the fused three-dimensional object can have a porosity from about 0.1 vol. % to about 60 vol. %.

When discussing the multi-fluid kit, the three-dimensional (3D) printing kit, and/or the method of 3D printing herein, these discussions can be considered applicable to one another whether or not they are explicitly discussed in the context of that example. Thus, for example, when discussing a wetting agent related to a multi-fluid kit, such disclosure is also relevant to and directly supported in the context of the 3D printing kit, the method of 3D printing, and vice versa.

Terms used herein will have the ordinary meaning in the relevant technical field unless specified otherwise. In some instances, there are terms defined more specifically throughout the specification or included at the end of the present specification, and thus, these terms can have a meaning as described herein.

Multi-Fluid Kits

In accordance with examples of the present disclosure, a multi-fluid kit 10 is shown in FIG. 1. The multi-fluid kit can include a wetting agent 100 and a binding agent 200. The wetting agent can include from 0 wt % to about 48.8 wt % water, from about 0.2 wt % to about 30 wt % of a film-forming organic solvent that can have a boiling point from greater than about 100° C. to about 350° C., and from about 30 wt % to about 99.5 wt % of an amphiphilic solvent that can have a boiling point from about 45° C. to less than about 100° C. The amphiphilic solvent can be water-miscible and can be present in the wetting agent at a greater concentration than the water and at a greater concentration than the film-forming solvent. The binding agent can include from about 2 wt % to about 30 wt % of a polymer binder 210 dispersed in an aqueous liquid vehicle 220.

Three-Dimensional Printing Kits

Figure 2:
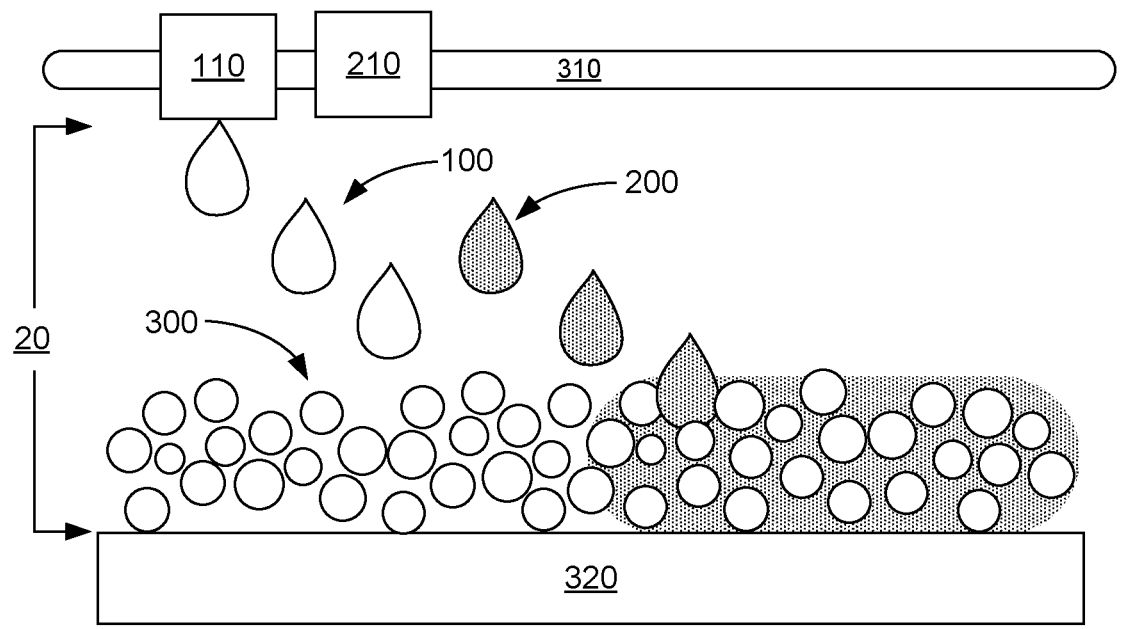
FIG. 2 graphically illustrates a three-dimensional printing kit in accordance with the present disclosure.
Figure 3:
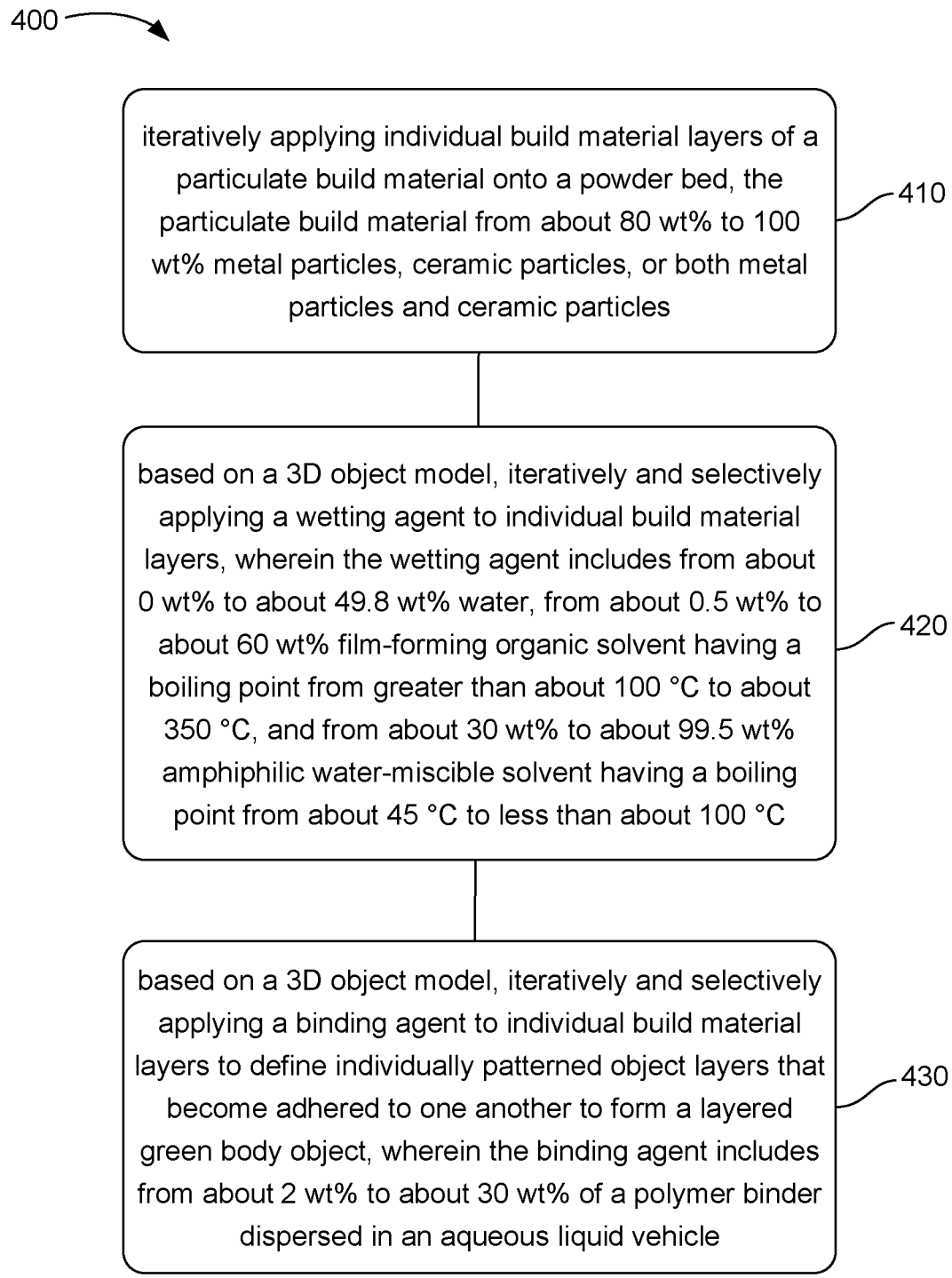
FIG. 3 is a flow diagram illustrating an example method of 3D printing in accordance with the present disclosure.

In accordance with another example of the present disclosure, a three-dimensional (3D) printing kit 20 is shown in FIG. 2. The 3D printing kit can include a wetting agent 100, a binding agent 200, and a particulate build material 300. In this example, a wetting agent is applied using a wetting agent fluid ejector 110, and the binding agent is applied using a binding agent fluid ejector 210, both of which may be included on a carriage track 310 or other similar structure. It is noted, however, that there can be other application architecture alternatively used as described in greater detail herein. Furthermore, the particulate build material is supported in this example by a build platform, or more typically, by previously applied particulate build material layers, e.g., portions printed with a binding agent, portions printed with a wetting agent, and/or portions which may remain unprinted). In one example, the wetting agent can include from 0 wt % to about 49.8 wt % water, from about 0.2 wt % to about 60 wt % film-forming organic solvent that can have a boiling point from greater than about 100° C. to about 350° C., and from about 30 wt % to about 99.5 wt % amphiphilic water-miscible solvent that can have a boiling point from about 45° C. to less than about 100° C. The binding agent can include from about 2 wt % to about 30 wt % of a polymer binder dispersed in an aqueous liquid vehicle. The particulate build material can include from about 80 wt % to 100 wt % metal particles, ceramic particles, or both metal particles and ceramic particles. The wetting agent, the binding agent, or both the wetting agent and the binding agent, may be packaged or co-packaged with the particulate build material in separate containers, and/or can be combined with the particulate build material at the time of printing. The wetting agent and the binding agent can be as described above.

Wetting Agents

In further reference to FIGS. 1 and 2, regarding the wetting agent 100 that may be present in the multi-fluid kit, the three-dimensional (3D) printing kit, or utilized in the method of 3D printing as described herein, the wetting agent can include both an amphiphilic water-miscible solvent and a film-forming organic solvent. The wetting agent can be used to wet a particulate build material prior to applying a binding agent. The wetting agent can act to minimize structural disruption of the particulate build material and can increase penetration of the binding agent into a layer of the particulate build material.

The wetting agent can include from about 30 wt % to about 99.5 wt % of an amphiphilic water-miscible solvent. In yet other examples, the wetting agent can include from about 50 wt % to about 95 wt %, from about 60 wt % to about 99 wt %, from about 75 wt % to about 95 wt %, from about 60 wt % to about 80 wt % or from about 55 wt % to about 85 wt % of an amphiphilic water-miscible solvent. An amphiphilic water-miscible solvent as used herein, can include both hydrophilic and lipophilic components. Due to the presence of hydrophilic and lipophilic segments, the amphiphilic solvent can easily and very quickly wet surfaces of a variable nature (both hydrophobic and hydrophilic) and can render them uniformly wettable at faster rates when subsequently wetted by water-based binder formulations. In some examples herein, the amphiphilic solvent water-miscible can be present in an amount in the wetting agent that can be greater than the amount of the film-forming solvent. In another example, the amphiphilic water-miscible solvent can be present in an amount in the wetting agent that can be greater than the amount of water. In still other examples, the amphiphilic solvent water-miscible can be present in an amount in the wetting agent that is greater than both the amount of film-forming solvent and the amount of water.

In an example, an amphiphilic water-miscible solvent can include volatile alcohols having a weight average molecular weight of from about 30 MW to about 100 MW, volatile ketones, formamides, water-soluble ethers, water-soluble volatile nitriles, and the like. In another example, an amphiphilic water-miscible solvent can include ethanol, methanol, 1-propanol, isopropanol, 1-butanol, acetone, methyl ethyl keytone, dimethylformamide, tetrahydrofuran, 1,4-dioxane, acetonitrile, or a mixture thereof. In one example, the amphiphilic water-miscible solvent can be ethanol. In another example, the amphiphilic water-miscible solvent can include ethanol and the film-forming solvent can include 1,2-butanediol.

The amphiphilic water-miscible solvent can have a surface tension that can be less than the surface tension of water (72.8 millinewtons per meter at 20° C.). In one example, a surface tension of the amphiphilic water-miscible solvent can range from about 20 millinewtons per meter to about 40 millinewtons per meter when measured at 20° C. In other examples, a surface tension of the amphiphilic water-miscible solvent can range from about 25 millinewtons per meter to about 35 millinewtons per meter, from about 20 millinewtons per meter to about 30 millinewtons per meter, or from about 30 millinewtons per meter to about 40 millinewtons per meter. The low surface tension of the amphiphilic water-miscible solvent can allow the amphiphilic water-miscible solvent to uniformly wet a particulate build material faster than water and can minimize particle displacement when applied to a particulate build material. A surface tension of a fluid can be measured by tensiometer.

The amphiphilic water-miscible solvent can have a boiling point less than water. In one example, the amphiphilic solvent can have a boiling point that can range from about 45° C. to less than about 100° C. In yet other examples, the amphiphilic solvent can have a boiling point that can range from about 40° C. to about 99.9° C., from about 50° C. to about 95° C., from about 50° C. to about 80° C., or from about 60° C. to about 90° C.

The wetting agent can further include from about 0.2 wt % to about 60 wt % of a film-forming organic solvent. In certain more specific examples, the film-forming organic solvent can be included at from about 0.5 wt % to about 60 wt % or from 0.5 wt % to about 30 wt %. In other examples, the film-forming solvent can be present at from about 1 wt % to about 30 wt %, at from about 2 wt % to about 12 wt %, at from about 5 wt % to about 25 wt %, from about 5 wt % to about 15 wt %, or from about 25 wt % to about 45 wt %.

The film-forming solvent can include aliphatic alcohols, aromatic alcohols, alkyl diols, glycols, glycol ethers, polyglycol ethers, 2-pyrrolidinones, caprolactams, formamides, acetamides, 1,2-butanediol, other diols, other glycols, C3 to C12 alcohols, or a mixture thereof. In one example, the film-forming solvent can include glycol. In another example, the film-forming solvent can include 2-pyrrolidinone. In one example, the amphiphilic solvent can be ethanol and the film-forming solvent can be 1,2 butanediol, or other diols or glycols.

The film-forming solvent can have a boiling point greater than water. In one example, the film-forming solvent can have a boiling point that can range from greater than about 100° C. to about 350° C. In yet other examples, the film-forming solvent can have a boiling point that can range from about 125° C. to about 300° C., from about 125° C. to about 250° C., from about 150° C. to about 350° C., from about 200° C. to about 350° C., or from about 150° C. to about 250° C.

The film-forming solvent can create a hydrophilic film on a particle surface of the particulate build material after the evaporation of the amphiphilic solvent. The hydrophilic film can minimize particle displacement during application of the binding agent, for example.

In some examples, the wetting agent can further include from 0 wt % to about 49.8 water. In other examples, the water can be present at from 0 wt % to about 30 wt %, from 0 wt % to about 20 wt %, from 0 wt % to about 10 wt %, from 0 wt % to about 5 wt %, from about 1 wt % to about 30 wt %, from about 5 wt % to about 25 wt %, from about 15 wt % to about 45 wt %, or from about 2 wt % to about 20 wt %. In yet other examples, the wetting agent can exclude water. When present, the water can be deionized, for example. In many examples, as the concentration of water is decreased, the effectiveness of the wetting agent tends to increase, but this may not be the case with every combination of wetting agent and particulate build material.

In some examples, the wetting agent can further include a colorant. The colorant can include a pigment, a dye, or both a pigment and a dye. In some examples, there is no colorant present. However, in other examples, where a colorant is included, it may be included for the purpose of providing a visual clue or indicator that the wetting agent has been applied at a given location, or to provide an indicator or clue as to nozzle health. As the present disclosure is drawn to printing and then heat-fusing green body objects to form heat-fused metal objects, typically the colorant would burn off during sintering or annealing. Thus, small concentrations of colorant can be used, if at all. If included, the colorant can be present up to 5 wt %, for example. Example ranges may be from about 0.01 wt % to about 5 wt %, from about 0.1 wt % to about 4 wt %, from about 0.5 wt % to about 4 wt %, from about 1 wt % to about 4 wt %, or from about 2 wt % to about 4 wt %, or from about 2 w % to about 4 wt %.

Binding Agents

In further reference to FIGS. 1 and 2, regarding the binding agent 200 that may be present in the multi-fluid kit 10 for 3D printing, the three-dimensional (3D) printing kit, or utilized in the method of 3D printing as described herein, the binding agent can include a liquid vehicle 210 and a binder 220 to bind the particulate build material together during the build process to form a green body object. The term "binder" can include any material used to physically bind the particles of the particulate build material, e.g., metal particles, ceramic particles, etc., together or facilitate adhesion to a surface of adjacent particles in order to prepare a green part or green body object in preparation for subsequent heat-fusing, e.g., sintering, annealing, melting, etc. During 3D printing, a binding agent can be applied to the particulate build material on a layer by layer basis. The liquid vehicle of the binding agent can be capable of wetting a particulate build material and the binder can move into vacant spaces between particles of the particulate build material, for example.

The binding agent can provide binding to the particulate build material upon application, or in some instances, can be activated after application to provide binding. The binder can be activated or cured by heating the binder (which may be accomplished by heating an entire layer of the particulate build material on at least a portion of the binding agent which has been selectively applied). If the binder is a polymer binder, then this may occur at about the glass transition temperature of the binder, for example. When activated or cured, the binder can form a network that adheres or glues the particles of the particulate build material together, thus providing cohesiveness in forming and/or holding the shape of the green body object or a printed layer thereof. A "green" part or green body object or article (or individual layer) can refer to any component or mixture of components that are not yet sintered or annealed, but which are held together in a manner sufficient to permit heat-fusing, e.g., handling, moving, or otherwise preparing the part for heat-fusing.

Thus, in one example, the green body object can have the mechanical strength to withstand extraction from a powder bed and can then be sintered or annealed to form a heat-fused article. Once the green part or green body object is sintered or annealed, the article can sometimes be referred to as a "brown" article, but more typically herein as a "heat-fused" article, part, or object. The term "sinter" or "sintering" refers to the consolidation and physical bonding of the particles together (after temporary binding using the binding agent) by solid state diffusion bonding, partial melting of particles, or a combination of solid state diffusion bonding and partial melting. The term "anneal" or "annealing" refers to a heating and cooling sequence that controls the heating process and the cooling process, e.g., slowing cooling in some instances can remove internal stresses and/or toughen the heat-fused part or article (or "brown" part). In some examples, the binder contained in the binding agent can undergo a pyrolysis or burnout process where the binder may be removed during sintering or annealing. This can occur where the thermal energy applied to a green body part or article removes inorganic or organic volatiles and/or other materials that may be present either by decomposition or by burning the binding agent. In other examples, if the binder includes a metal, such as a reducible metal compound, the metal binder may remain with the heat-fused article after sintering or annealing.

The binder can be included, as mentioned, in a liquid vehicle for application to the particulate build material. For example, the binder can be present in the binding agent at from about 1 wt % to about 49.8 wt %, from about 2 wt % to about 30 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt % in the binding agent.

In one example, the binder can include polymer particles, such as latex polymer particles. The polymer particles can have an average particle size that can range from about 3 nm to about 1 μm. In other examples, the polymer particles can have an average particle size that can range from about 5 nm to about 700 nm, from about 20 nm to about 500 nm, from about 30 nm to about 400 nm, or from about 50 nm to about 350 nm.

In one example, the latex particles can include any of a number of copolymerized monomers, and may in some instances include a copolymered surfactant, e.g., polyoxyethylene compound, polyoxyethylene alkylphenyl ether ammonium sulfate, sodium polyoxyethylene alkylether sulfuric ester, polyoxyethylene styrenated phenyl ether ammonium sulfate, etc. The copolymerized monomers can be from monomers, such as styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

With respect to the liquid vehicle, binding agent can include from about 50 wt % to about 99 wt %, from about 70 wt % to about 98 wt %, from about 80 wt % to about 98 wt %, from about 60 wt % to about 95 wt %, or from about 70 wt % to about 95 wt % liquid vehicle, based on the weight of the binding agent as a whole. In one example, the liquid vehicle can include water as a major solvent, e.g., the solvent present at the highest concentration when compared to other co-solvents. In another example, the liquid vehicle can further include from about 0.1 wt % to about 70 wt %, from about 0.1 wt % to about 50 wt %, or from about 1 wt % to about 30 wt % of liquid components other than water. The other liquid components can include organic co-solvent, surfactant, additive that inhibits growth of harmful microorganisms, viscosity modifier, pH adjuster, sequestering agent, preservatives, etc.

When present, organic co-solvent(s) can include high-boiling solvents and/or humectants, e.g., aliphatic alcohols, aromatic alcohols, alkyl diols, glycol ethers, polyglycol ethers, 2-pyrrolidinones, caprolactams, formamides, acetamides, C6 to C24 aliphatic alcohols, e.g. fatty alcohols of medium (C6-C12) to long (C13-C24) chain length, or mixtures thereof. The organic co-solvent(s) in aggregate can be present from 0 wt % to about 50 wt % in the binding agent. In other examples, organic co-solvents can be present at from about 5 wt % to about 25 wt %, from about 2 wt % to about 20 wt %, or from about 10 wt % to about 30 wt % in the binding agent.

Particulate Build Materials

In further reference to FIG. 2, the particulate build material 300 can include from about 80 wt % to 100 wt % metal particles, ceramic particles, or both metal and ceramic particles based on a total weight of the particulate build material. When the particulate bed material includes metal particles, the metal particles can be selected from steels, stainless steels, other ferrous alloys, bronzes, titanium, titanium alloys, aluminum, aluminum alloys, nickel, nickel alloys, cobalt, cobalt alloys, iron, iron alloys, nickel cobalt alloys, gold, gold alloys, silver, silver alloys, platinum, platinum alloys copper, copper alloys, niobium alloys, etc. Metals included in the alloys can be any of the metals listed above, and/or may likewise include chromium, vanadium, tungsten, tungsten (tungsten carbide), tantalum, molybdenum, magnesium, etc., or even nonmetals or metalloids, such as silicon, boron, germanium, etc.

If a ceramic is used, the ceramic material selected can include metal oxides, inorganic glasses, carbides, nitrides, borides, and the like. In an example, the ceramic particles can include alumina glass, soda-lime glass, borosilicate glass, alumina silica glass, silicon mononitride, silicon dioxide, zirconia, titanium dioxide, magnesium aluminate, tin oxide, yttrium oxide, hafnium oxide, tantalum oxide, scandium oxide, niobium oxide, vanadium oxide, or a combination thereof.

When the particulate build material includes both metal particles and ceramic particles, a ratio of metal particles to ceramic particles can range from about 20:1 to about 1:2 by volume. In other examples, a ratio of metal particles to ceramic particles can range from about 10:1 to about 1:1, or from about 10:1 to about 4:1. In an example, the particulate build material can include metal particles at from about 75 vol % to about 100 vol. % and ceramic particles up to about 25 vol. wt %. In other examples, the particulate build material can include metal particles and there may be no ceramic particles present. In still other examples, there may be multiple types of metal particles present, or there may be metal particles present with filler, flow control agent, or the like, in small quantities, e.g., from about 0.01 wt % to about 5 wt %.

In an example, the metal particles can be a single phase metallic material composed of one element. In this example, the sintering temperature may be below the melting point of the single element. In another example, the metal particles can be composed of two or more elements, which may be in the form of a single phase metallic alloy or a multiple phase metallic alloy. In these other examples, sintering generally can occur over a range of temperatures. With respect to alloys, materials with a metal alloyed to a non-metal (such as a metal-metalloid alloy) can be used as well.

The temperature(s) at which the metallic particles and/or ceramic particle of the particulate build material sinter can be above the temperature of the environment in which patterning (with the binding agent) is performed (e.g., patterning at from about 100° C. to about 250° C.). In some examples, the metal particles and/or ceramic particles may be sintered at from about 500° C. to about 3,500° C., depending on the material. Other temperature ranges that can be used, depending on the particulate build material metal and/or ceramic chosen or formulated for use, can be from about 800° C. to about 2,500° C., from about 1,000° C. to about 1,800° C., or from about 1,200° C. to about 1,600° C. For example, stainless steel alloys may be sinterable from about 1,100° C. to about 1,500° C., whereas copper alloys may be sinterable at a considerable lower temperature, e.g., from about 750° C. to about 1,000° C. A ceramic such as alumina, for example, may be sinterable at higher temperatures starting at about 1,400° C. but may be a higher or lower temperature depending on material particle size, for example. Again, this depends on the specific material chosen.

The particles can have a D50 particle size from about 0.1 µm to about 150 µm. Metal particles can have a D50 particle size that can range from about 3 µm to about 150 µm, from about 10 µm to about 100 µm, from about 20 µm to about 80 µm, from about 30 µm to about 50 µm, from about 25 µm to about 75 µm, from about 40 µm to about 80 µm, from about 50 µm to about 75 µm, from about 5 µm to about 60 µm, from about 60 µm to about 90 µm, or from about 15 µm to about 85 µm, for example. Ceramic particles can have a D50 particle size that can range from about 0.1 µm to about 50 µm, from about 0.1 µm to about 10 µm, from about 0.1 µm to about 1 µm, from about 0.5 µm to about 25 µm, from about 0.1 µm to about 5 µm, from about 0.5 µm to about 3 µm, from about 0.1 µm to about 2 µm, or from about 0.1 µm to about 1 µm. As used herein, particle size can refer to a value of the diameter of spherical particles or in particles that are not spherical can refer to the equivalent spherical diameter of that particle. The particle size can be presented as a Gaussian distribution or a Gaussian-like distribution (or normal or normal-like distribution). Gaussian-like distributions are distribution curves that can appear Gaussian in distribution curve shape, but which can be slightly skewed in one direction or the other (toward the smaller end or toward the larger end of the particle size distribution range). That being stated, an example Gaussian-like distribution of the particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of about 25 µm means that about 50% of the particles (by number) have a particle size greater than about 25 µm and about 50% of the particles have a particle size less than about 25 µm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same. In examples herein, the particle size ranges can be modified to "average particle size," providing sometimes slightly different size distribution ranges.

A shape of the particles can be spherical, irregular spherical, rounded, semi-rounded, discoidal, angular, subangular, cubic, cylindrical, or any combination thereof. In one example, the particles can include spherical particles, irregular spherical particles, or rounded particles. In some examples, the shape of the particles can be uniform or substantially uniform, which can allow for relatively uniform melting or sintering of the particles.

Three-Dimensional Printing Methods

A flow diagram of an example method of three-dimensional (3D) printing 400 is shown in FIG. 4. It is noted that the multi-fluid kit and/or the three-dimensional printing kit used can be as described in either of the examples set forth in FIGS. 1 and 2, for example. The method can include iteratively applying 410 individual build material layers of a particulate build material onto a powder bed. The particulate build material can include from about 80 wt % to 100 wt % metal particles, ceramic particles, or both metal particles and ceramic particles. The method can further include, based on a 3D object model, iteratively and selectively applying 420 a wetting agent to individual build material layers. The wetting agent can include from 0 wt % to about 49.8 wt % water, from about 0.5 wt % to about 60 wt % film-forming organic solvent, and from about 30 wt % to about 99 wt % amphiphilic water-miscible solvent. The film-forming organic solvent can have a boiling point that can range from greater than about 100° C. to about 350° C. The amphiphilic water-miscible solvent can have a boiling point that can range from about 45° C. to less than about 100° C. The amphiphilic water-miscible solvent can be present in the wetting agent at a greater concentration than the film-forming organic solvent. The method can further include, based on a 3D object model, iteratively and selectively applying 430 a binding agent to individual build material layers to define individually patterned object layers that can become adhered to one another to form a layered green body object. The binding agent can include from about 2 wt % to about 30 wt % of a polymer binder dispersed in an aqueous liquid vehicle.

After an individual particulate build material layer is printed thereon with the wetting agent and the binding agent, in some instances the individual build material layer can be heated to drive off water and/or other liquid components, as well as to further solidify the layer of the 3D green body object. The heat can be applied from overhead and/or can be provided by a build platform from beneath the particulate build material. In other examples, the particulate build material can be heated prior to dispensing.

During printing, the build platform can be dropped a distance that corresponds to a thickness of particulate build material that is spread for the next layer of the green body object or article to be formed, so that another layer of the particulate build material can be added thereon, printed with wetting agent, binding agent, heated, etc. This process can be repeated on a layer by layer basis until the green body object is formed.

Following the formation of the green body object, in one example, the entire green body object can be moved to an oven and fused by sintering and/or annealing. The method can include heating the green body object to a debinding temperature (ranging from about 300° C. to 550° C.) in order to remove polymer binder via pyrolysis and then heating the green body object to a sintering temperature (which is below melting temperature of the particulate build material) ranging from about 600° C. to about 3,500° C. During sintering the build material particles can consolidate into the final part. Sintering the green body object can include heating the green body object to a temperature ranging from about 600° C. to about 3,500° C. to fuse individual particles of the particulate build material together and form a heat-fused three-dimensional article. In some examples, the temperature can range from about 1,200° C. to about 1,400° C., from about 1,000° C. to about 3,000° C., or from about 600° C. to about 2,000° C. In one example, the heat-fused three-dimensional article can have a porosity that can range from about 0.1 vol % to about 60 vol % or from about 0.1 vol % to about 40 vol %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range. As used herein, "kit" can be synonymous with and understood to include a plurality of compositions including multiple components where the different compositions can be separately contained in the same or multiple containers prior to and during use, e.g., building a 3D object, but these components can be combined together during a build process. The containers can be any type of a vessel, box, or receptacle made of any material.

As used herein, "green" describes any of a number of intermediate structures prior to any particle to particle material fusing, e.g., green part, green body, green body object, green body layer, etc. As a "green" structure, the particulate build material can be (weakly) bound together by a binder. Typically, a mechanical strength of the green body is such that the green body can be handled or extracted from a particulate build material on build platform to place in an oven, for example. It is to be understood that any particulate build material that is not patterned with the binding agent is not considered to be part of the "green" structure, even if the particulate build material is adjacent to or surrounds the green body object or layer thereof. For example, unprinted particulate build material can act to support the green body while contained therein, but the particulate build material is not part of the green structure unless the particulate build material is printed with a binding agent to generate a solidified part prior to fusing, e.g., sintering, annealing, melting, etc.

The term "fuse," "fusing," "fusion," "heat-fused" or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, the terms three-dimensional (or 3D) "part," "object," "article," or the like, refer to the target object that is being built, typically in two phases, e.g., formation of a green body object followed by heat fusion of the green body object to form a heat-fused article. The 3D object after heating to a sintering or anneal temperature sufficient for metal and/or ceramic inter-particle fusion can be referred to as a "heat-fused" article, indicating that the object has been fused together into a sturdy and rigid part, such as by sintering, annealing, melting, etc. On the other hand, the term "green body" or "green" when referring to the object, part, or article indicates that the 3D object has been solidified, but not yet heat-fused.

As used herein, "applying" when referring to a binding agent or other fluid agents that may be used, for example, refers to any technology that can be used to put or place the fluid agent, e.g., binding agent, on the particulate build material or into a layer of particulate build material for forming a 3D green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following is only illustrative of the application of the principles of the present disclosure. Numerous modifications and alternative multi-fluid kits, three-dimensional printing kits, compositions, methods, systems, etc., may be devised without departing from the spirit and scope of the present disclosure. The appended claims are intended to cover such modifications and arrangements.

Example 1—Wetting Agent Formulations

Various wetting agents were prepared incorporating an amphiphilic solvent, a film-forming solvent, and water as indicated in Table 1 below.

TABLE 1

| Wetting Agent Formulation ID | [1]Ethanol (Amphiphilic Solvent) | [1]1,2-butanediol (Film-forming Solvent) | [1]Water | [2]Surface Tension (dyne/cm) |
|---|---|---|---|---|
| 1 | 30 wt % | 10 wt % | 60 wt % | 31 |
| 2 | 45 wt % | 10 wt % | 55 wt % | 29 |
| 3 | 60 wt % | 10 wt % | 30 wt % | 27 |
| 4 | 90 wt % | 10 wt % | 0 wt % | 23 |

[1]Boiling Points: ethanol (78.36° C.); 1,2-butanediol (196° C.-196.9° C.); water (100° C.)
[2]Wetting agents with more water, exhibited higher surface tensions, e.g., Wetting Agent 4, which excluded water, exhibited the lowest surface tension.

Example 2—Wetting Agent Penetration into Particulate Build Material

A droplet of each of the four wetting agents of Table 1 was pipetted onto a 2 mm thick layer of stainless steel 316L powder (D50~12-13 um) particulate build material and was visually observed to determine how long it took for the respective wetting agents to penetrate the particulate layer, e.g. when the wetting agent was not visible as a layer of fluid over the particulate layer. The data collected is shown in Table 2, as follows:

TABLE 2

| Penetration Time | | |
|---|---|---|
| Wetting Agent Formulation ID | [2]Surface Tension (dyne/cm) | Time (min) |
| 1 | 31 | 4 |
| 2 | 29 | 1.5 |
| 3 | 27 | 0.6 |
| 4 | 23 | 0.5 |

Wetting agents with less surface tension exhibited fewer intermolecular forces than wetting agents with more surface tension and were able to distribute into the space between particles of the particulate build material faster.

Example 3—Binding Agent Penetration with and without Wetting Agent

Based on the data collected in Example 2, Wetting Agent 4 from Table 1 was selected for further evaluation for use in connection with a binding agent formulation and the same stainless steel particulate build material. The binding agent had the formulation indicated in Table 3 below.

TABLE 3

| Binding Agent Formulation | | |
|---|---|---|
| Component | Component Type | Weight % |
| Proprietary acrylic latex | Binder | 12 |
| 1,2-Butanediol | Co-Solvent | 26 |
| Tergitol 15-S7 | Surfactant | 1 |
| Water | Solvent | balance |

For this evaluation, an 8 mg droplet of the binding agent was pipetted onto the layer of 316L stainless steel particles and was visually observed to determine how long it took for the binding agent to penetrate the particulate layer (e.g. when the binding agent was not visible as a layer of fluid over the particulate layer). The binding agent penetrated the particulate layer after 7 minutes.

At a different location, a 7 mg droplet of the wetting agent was pipetted onto the layer of 316L stainless steel particles and was visually observed to determine how long it took for the wetting agent to penetrate the particulate layer (e.g. when the wetting agent was not visible as a layer of fluid over the particulate layer). The wetting agent penetrated the particulate layer in less than 20 seconds.

At a different location, a 7 mg droplet of the wetting agent was pipetted onto the layer of 316L stainless steel particles and an 8 mg droplet of the binding agent was pipetted onto the layer of 316L stainless steel particles at the same location. In this example, again, the layer was visually observed to determine how long it took for the wetting agent and the binding agent to penetrate the particulate layer (e.g. when the binding agent and the wetting agent were not visible as a layer of fluid over the particulate layer). In this instance, the binding agent penetrated the particulate layer within 3 minutes, due to the wetting assistance of the pre-applied wetting agent.

The application of a wetting agent prior to application of the binding agent improved penetration of the binding agent into the layer of the particulate build material. The inclusion of the wetting agent, decreased the time for the binding agent to penetrate the particulate build material layer.

Example 4—Printing Comparison of Binding Agent Applied to Particulate Build Material with and without Wetting Agent A 22 μm thick layer of stainless steel 316L particulate build material was printed on with the binding agent and with the wetting agent and the binding agent from Example 2 using a proprietary HP powderbed 3-D printing testbed. The particulate build material with the binding agent and/or wetting agent applied thereon was visually inspected. The layer printed on with the binding agent (excluding the wetting agent) appeared darker than the layer printed on with the wetting agent and the binding agent. Upon microscopic examination at 50 times magnification with a Keyence VHX-5000_digital microscope, the particulate build material layer surface with the binding agent (excluding the wetting agent) exhibited a textured appearance while the layer printed on with the wetting agent and the binding agent appeared smooth. When viewed at 500 times magnification, the particulate build material layer with the binding agent (excluding the wetting agent) appeared to include vein-like canyons throughout the layer.

What is claimed is:

1. A multi-fluid kit for three-dimensional printing comprising:
    a wetting agent including:
        from 0 wt % to about 49.8 wt % water,
        from about 0.2 wt % to about 30 wt % film-forming organic solvent having a boiling point from greater than about 100° C. to about 350° C., and
        from about 30 wt % to about 99.5 wt % amphiphilic solvent having a boiling point from about 45° C. to less than about 100° C., wherein the amphiphilic solvent is water-miscible and is present in the wetting agent at a greater concentration than the water and at a greater concentration than the film-forming solvent; and
    a binding agent including from about 2 wt % to about 30 wt % of a polymer binder dispersed in an aqueous liquid vehicle.

2. The multi-fluid kit of claim 1, wherein the film-forming solvent includes aliphatic alcohol, aromatic alcohol, alkyl diol, glycol, glycol ether, polyglycol ether, 2-pyrrolidinone, caprolactam, formamide, acetamide, 1,2-butanediol, C3 to C12 alcohol, or a mixture thereof.

3. The multi-fluid kit of claim 1, wherein the amphiphilic solvent includes ethanol, methanol, 1-propanol, isopropanol, 1-butanol, acetone, methyl ethyl keytone, dimethylformamide, tetrahydrofuran, 1,4-dioxane, acetonitrile, or a mixture thereof.

4. The multi-fluid kit of claim 1, wherein a surface tension of the amphiphilic solvent ranges from about 20 N/m to about 40 N/m when measured at 20° C.

5. The multi-fluid kit of claim 1, wherein the amphiphilic solvent is ethanol and the film-forming solvent is 2-pyrrolidinone.

6. The multi-fluid kit of claim 1, wherein the binding agent further includes a co-solvent and the co-solvent in the binding agent is the same as the film-forming solvent in the wetting agent.

7. The multi-fluid kit of claim 1, wherein the wetting agent is a nonaqueous wetting agent.

8. A three-dimensional printing kit comprising:
    a wetting agent including:
        from 0 wt % to about 49.8 wt % water,
        from about 0.2 wt % to about 60 wt % film-forming organic solvent having a boiling point from greater than about 100° C. to about 350° C., and
        from about 30 wt % to about 99.5 wt % amphiphilic water-miscible solvent having a boiling point from about 45° C. to less than about 100° C.;
    a binding agent including from about 2 wt % to about 30 wt % of a polymer binder dispersed in an aqueous liquid vehicle; and
    a particulate build material including from about 80 wt % to 100 wt % metal particles, ceramic particles, or both metal particles and ceramic particles.

9. The three-dimensional printing kit of claim 8, wherein the film-forming solvent is present in the wetting agent at from about 1 wt % to about 15 wt %.

10. The three-dimensional printing kit of claim 8, wherein the film-forming solvent includes 1,2-butanediol or other diols or glycols and the amphiphilic solvent includes ethanol.

11. The three-dimensional printing kit of claim 8, wherein the particulate build material includes from about 90 wt % to 100 wt % of the metal particles, and the metal particles have D50 particle size distribution value of from about 3 μm to about 100 μm.

12. The three-dimensional printing kit of claim 8, wherein the amphiphilic solvent is present in the wetting agent at a greater concentration than the water and at a greater concentration than the film-forming solvent.

13. A method of three-dimensional printing comprising:
    iteratively applying individual build material layers of a particulate build material onto a powder bed, the particulate build material from about 80 wt % to 100 wt % metal particles, ceramic particles, or both metal particles and ceramic particles;
    based on a 3D object model, iteratively and selectively applying a wetting agent to individual build material layers, wherein the wetting agent includes from 0 wt % to about 49.8 wt % water, from about 0.2 wt % to about 60 wt % film-forming organic solvent having a boiling point from greater than about 100° C. to about 350° C., and from about 30 wt % to about 99.5 wt % amphiphilic water-miscible solvent having a boiling point from about 45° C. to less than about 100° C.; and
    based on a 3D object model, iteratively and selectively applying a binding agent to individual build material layers to define individually patterned object layers that become adhered to one another to form a layered green body object, wherein the binding agent includes from about 2 wt % to about 30 wt % of a polymer binder dispersed in an aqueous liquid vehicle.

14. The method of claim 13, further comprising sintering the layered green body object to form a heat-fused article.

15. The method of claim 14, wherein the fused three-dimensional object has a porosity from about 0.1 vol % to about 60 vol %.

* * * * *